(12) United States Patent
Garber (10) Patent No.: US 9,811,833 B1
(45) Date of Patent: Nov. 7, 2017

(54) GIFT ORDERING SUBJECT TO RULES DEFINED BY A GIFT GIVER

(75) Inventor: Brian Ashley Garber, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 13/076,889

(22) Filed: Mar. 31, 2011

(51) Int. Cl.
  *G06Q 30/00* (2012.01)
  *G06Q 40/00* (2012.01)

(52) U.S. Cl.
  CPC ............ *G06Q 30/00* (2013.01); *G06Q 40/00* (2013.01)

(58) Field of Classification Search
  CPC ........... G06Q 30/0601; G06Q 30/0619; G06Q 30/00; G06Q 40/00
  USPC ...................................................... 705/26.1
  See application file for complete search history.

(56) References Cited

U.S. PATENT DOCUMENTS

| | | | | |
|---|---|---|---|---|
| 6,138,106 | A * | 10/2000 | Walker et al. | 705/14.1 |
| 7,143,064 | B2 * | 11/2006 | Picciallo et al. | 705/39 |
| 7,761,344 | B2 * | 7/2010 | Smith | 705/26.2 |
| 7,831,439 | B1 * | 11/2010 | Bryar et al. | 705/1.1 |
| 8,036,944 | B2 * | 10/2011 | Lee et al. | 705/26.1 |
| 8,285,643 | B2 * | 10/2012 | Isaacson et al. | 705/41 |
| 8,321,299 | B2 * | 11/2012 | Smith | 705/26.8 |
| 2002/0133467 | A1 * | 9/2002 | Hobson et al. | 705/64 |
| 2005/0131772 | A1 * | 6/2005 | Chow et al. | 705/26 |
| 2005/0197919 | A1 * | 9/2005 | Robertson | 705/26 |
| 2007/0284434 | A1 * | 12/2007 | Fletcher | 235/379 |
| 2008/0052183 | A1 * | 2/2008 | Hobson et al. | 705/26 |
| 2009/0063295 | A1 * | 3/2009 | Smith | 705/26 |
| 2009/0171804 | A1 * | 7/2009 | Lee et al. | 705/26 |
| 2010/0017278 | A1 * | 1/2010 | Wilen et al. | 705/14.2 |
| 2010/0023341 | A1 * | 1/2010 | Ledbetter | G06Q 10/10 705/1.1 |
| 2010/0036746 | A1 * | 2/2010 | Hashop et al. | 705/26 |
| 2011/0099104 | A1 * | 4/2011 | Nybom | 705/41 |
| 2011/0106698 | A1 * | 5/2011 | Isaacson et al. | 705/41 |
| 2011/0307343 | A1 * | 12/2011 | Lee et al. | 705/26.1 |

OTHER PUBLICATIONS

Steve Burt et al. "E-commerce and the retail process: a review" Journal of Retailing and Consumer Services 10 (2003) 275-286.*

* cited by examiner

*Primary Examiner* — Naeem Haq
(74) *Attorney, Agent, or Firm* — Thomas | Horstemeyer, LLP (57) ABSTRACT

An order setup module receives a plurality of gift rules from a first person. A gift order is generated that includes the gift rules. The gift order is associated with credentials for use by a second person to complete the gift order. A selected product and the credentials are received from the second person. A determination is made whether the selected product satisfies the gift rules. The selected product is used to complete the gift order in response to determining that the selected product satisfies the gift rules.

26 Claims, 8 Drawing Sheets

Gift Rules Defined by Giver
through Order Setup Module

> Giver Payment Information

> Price range
 - Fixed or vary with product characteristics

> Product characteristics
 - Books
  + Author limitations
  + Age category limitations
  + Subject limitations
  + Media format limitations
   (paper or electronic)

- Electronics
  + Type limitations
  + Technical feature limitations
  + Brand limitations
  + Product rating limitations

- Clothing
  + Type limitations
  + Brand limitations

> Handling of exceptions to Gift Rules
 - No exceptions
 - Defined exceptions allowed with notification to Giver
 - Defined exceptions allowed only if Giver consents

Recipient Search Page
Restricted by Gift Rules

Advanced Search

Books

Magazines

~~Music~~

~~Classical Music~~

~~Movies & TV~~

~~Toys & Games~~

600 ⬅

Books Search

Keywords

Author: Patterson, Collins, Meyer

Title

Publisher

Subject: All Subjects ▸

610 ⬅

Condition: All Conditions ▸

Format: Electronic Download ▸

Reader Age: Teen ▸

Language: English ▸

620 ⬅

Sort Results by: Relevance ▸

( Search )

GIFT ORDERING SUBJECT TO RULES DEFINED BY A GIFT GIVER

BACKGROUND

The popularity of purchasing gifts through network shopping services (e.g., websites that enable users to make purchases on-line) has grown with the overall popularity of network shopping services. As in other gift-giving situations, it sometimes occurs that gifts purchased on-line do not meet the needs or tastes of the gift recipient. For example, the recipient may already have the gifted item or the item may not be the right size, type, style, color and so on.

For these and other reasons, a person may choose to give a gift card having a financial value for purchasing goods and/or services. A gift card allows the recipient freedom to select a gift that match's the recipient's needs and tastes. However, without knowing what gift the recipient will desire, the person giving the gift card may have difficultly deciding how expensive of a gift card to purchase that will leaving little to no residual value on the gift card after the gift is purchased. Gift cards can also have a negative stigma as being an impersonal gift.

DETAILED DESCRIPTION

Various embodiments described herein enables a person to provide a gift that includes one or more gift rules that control how another person who is receiving the gift can select a product to complete the gift order. For convenience of reference, a person who is giving a gift is also referred to herein as a "Giver", and a person who is receiving the gift is also referred to herein as a "Recipient."

A Giver may create gift rules that define characteristics that a product needs to satisfy to be covered by a gift order. For example, the gift rules may define that a Recipient can select any book to complete a gift order, or the gift rules may further constrain the Recipient's choices to books that satisfy certain Giver defined limitations on authors, age appropriate categories, subjects, and/or media formats (e.g. paper books or electronic downloadable books).

The gift rules may define how much cost of a product that is selected by the Recipient will be paid for by the Giver. The gift rules may restrict the Recipient to selecting a product that is within a defined price range, or may obligate the Giver to pay no more than a defined cost if the selected product exceeds the defined price range. The gift rules may further define different price ranges for different types of products that can be selected by the Recipient. For example, the Giver may define gift rules that allow the Recipient to select an electronic game or a book, and may define a higher price range that the Giver will pay for electronic game gift than the Giver will pay for a book gift based on an expectation that the electronic game will cost more than the book.

The Giver may provide further product selection flexibility to the Recipient by defining exceptions that allow a Recipient to select a product that does not satisfy one or more of the gift rules. For example, the gift rules may define that if the Recipient selects a product that does not satisfy certain product characteristics and/or a product that is outside a defined price range, the Giver may be contacted through an electronic notification that requests authorization for the product.

The Giver is thereby able to create a gift order that provides a gift has personalization and flexibility to satisfy the needs and tastes of both the Recipient and the Giver.

Example Gift Order Handling System

Figure 1:
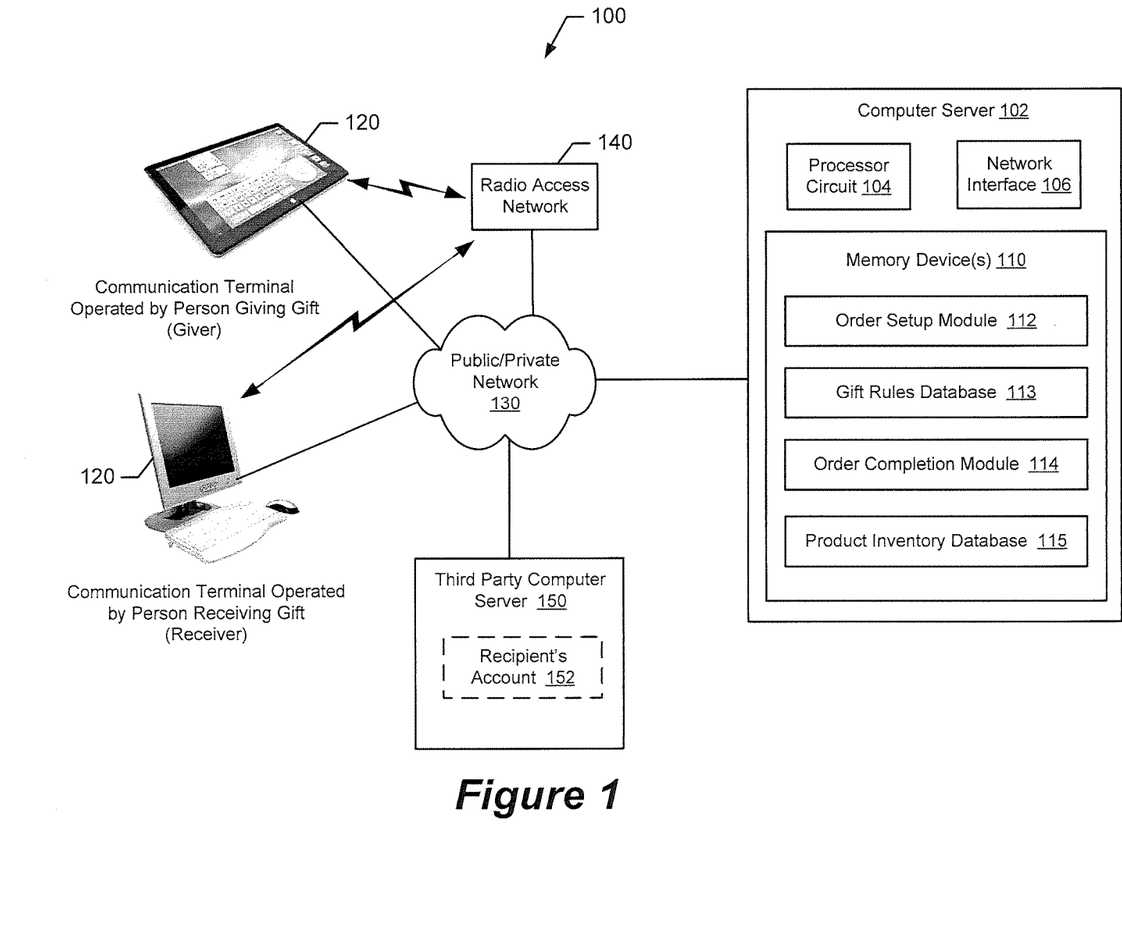
FIG. 1 is a block diagram of systems, computer servers, methods and computer program products for controlling gifting from one person to another according to some embodiments described herein.

FIG. 1 is a block diagram of systems, computer servers, methods and computer program products for controlling gifting from one person to another according to some embodiments described herein. Referring to FIG. 1, a gift order handling system 100 may include a computer server 102 that communicates with a plurality of user communication terminals 120 using wired connections through a network 130 and/or using wireless connections through a radio access network 140. The computer server 102 may be operated by any type of online merchant and/or service provider and may, for example, sell products (e.g., tangible goods or services) from an inventory that the online merchant controls and/or from one or more other merchant's inventories (e.g., operating as a third party comparison shopping service).

The computer server 102 is configured to set up a gift order in response to instructions that are received from a Giver of a gift, and to complete the gift order in response to other instructions that are received from the Recipient of the gift. The Giver and the Recipient may operate the same or different ones of the communication terminals 120.

The computer server 102 may include memory device(s) 110, a processor circuit 104, and a network interface 106. The memory device(s) 110 contain functional modules, which may include an order setup module 112, a gift rules database 113, an order completion module 114, and/or a product inventory database 115. The processor circuit 104 may include one or more data processing circuits, such as a general purpose and/or special purpose processor (e.g., microprocessor and/or digital signal processor) with on-board and/or separate memory devices. The processor circuit 104 is configured to execute computer program instructions in the functional modules (e.g., order setup module 112 and order completion module 114) within the memory device(s) 110, which is described below as a computer readable medium, to operate as described herein. The network interface 106 is configured to communicate with the communicate terminals 120 through the network 130 and/or the radio access network 140.

Example Operations and Methods for Setting-Up of Gift Order

Figure 2:
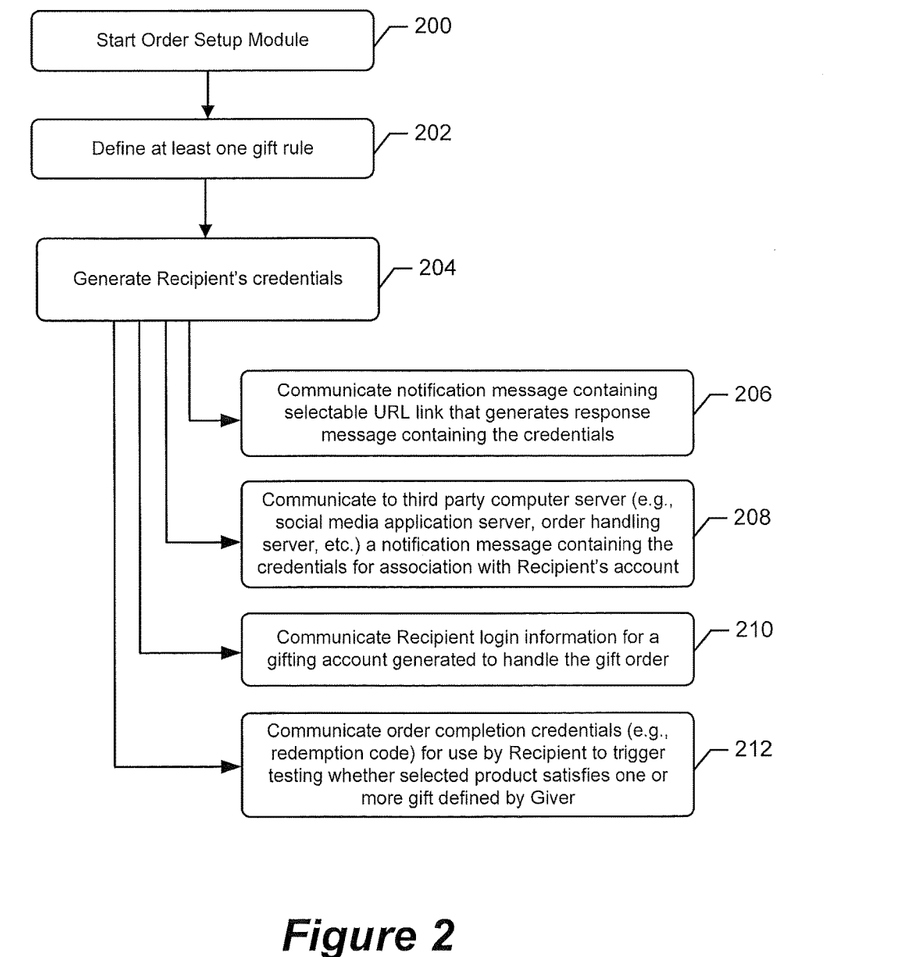
FIG. 2 is a flowchart of operations and methods that may be performed by the order setup module of FIG. 1 responsive to instructions from a person who is giving a gift according to some embodiments described herein.

FIG. 2 is a flowchart of operations and methods that may be performed by the order setup module 112 of FIG. 1 in response to instructions received from the Giver. Referring to FIG. 2, the Giver uses the order setup module 112 to setup a gift order having at least one gift rule that is defined by the Giver. The order setup module 112 may start setting-up the gift order (block 200) in response to the Giver connecting to the computer server 102 by, for example, launching a functional application on the communication terminal 120 or by logging into an existing or new account on the computer server 102 through a web client on the communication terminal 120.

The Giver provides instructions that cause the order setup module 112 to define at least one gift rule (block 202). The gift rule may be a payment rule that defines how much the Giver will be charged to complete the gift order and/or may define at least one product characteristic that must be satisfied by a product in order to be covered by the gift order.

Example Gift Rules Defined by the Giver

Figure 3:
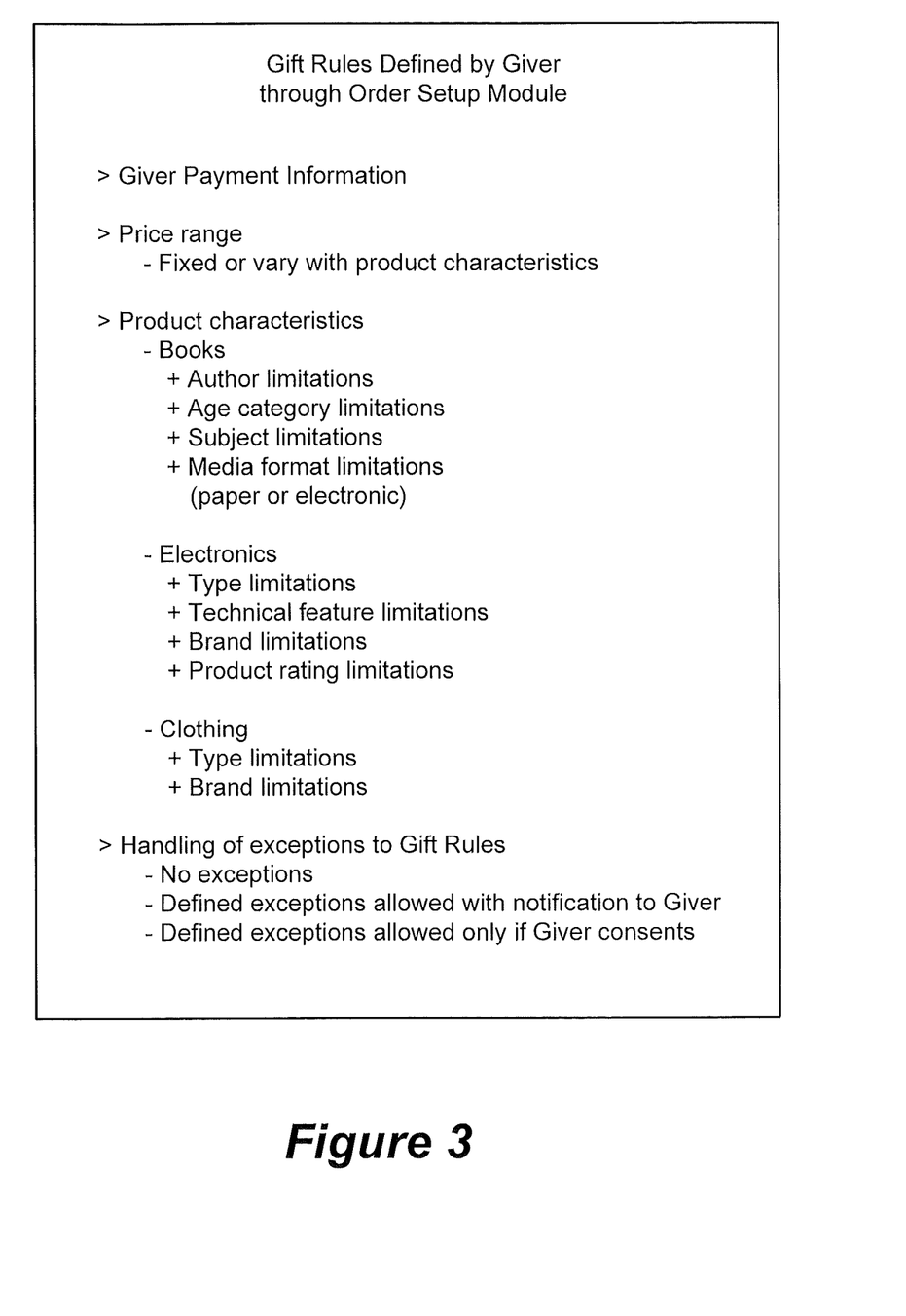
FIG. 3 is a diagram that lists gift rules that may be defined by a gift giver through the order setup module and used by the order completion module of FIG. 1 according to some embodiments described herein.

FIG. 3 is a diagram that lists example gift rules that may be defined by a Giver through the order setup module 112 and stored in the gift rules database 113 for later use by the order completion module 114. Referring to FIG. 3, the gift rules may define payment information (e.g. credit card information, debit card information, etc.) for how the cost for a gift will be charged to the Giver. The gift rules may further define one or more price ranges that control how much cost will be charged to the Giver, define product characteristics that must be satisfied by a product to be covered by the gift order, and/or define how exceptions to various ones of the gift rules may be handled.

When defining gift rules relating to a price range, the gift rules may restrict the Recipient to selecting a product that is within a defined price range, or the gift rules may set a maximum cost that will be charged to the Giver if the selected product exceeds the defined price range. The Giver may define different price ranges for products having different defined characteristics. For example, as explained above, the Giver may define a first price range that applies to a book gift, a second price range that applies to an electronic gift, a third price range for a clothing gift, and may define further price ranges based on other defined characteristics of products that can be selected as a gift. The gift rules may further define whether the maximum cost that will be charged to the Giver includes the cost of taxes, shipping, and/or other miscellaneous costs associated with the product and/or handling of the gift order.

Example product characteristics are shown in FIG. 3 that can be defined by the Giver as gift rules to control what product the Recipient can select to be covered as a gift under the gift order. The example product categories include books, electronic devices, and clothing. When the Giver allows a book to be selected as a gift under the gift order, the gift rules may be defined to limit the Recipient to selecting books that satisfy defined author limitations, age appropriate category limitations, subject limitations, and/or media format limitations (e.g., paper or electronic downloadable media).

When the Giver allows an electronic device to be selected as a gift under the gift order, the gift rules may be further defined to limit the Recipient to selecting electronic device that satisfies type limitations (e.g., TV/Video devices, home audio devices, computers, cameras, video equipment, cell phones, video game devices, digital music players/recorders, car electronics, etc.), technical feature limitations (e.g, computer memory/storage capacity, processor speed, display size, battery life, etc.), brand limitations (e.g., SONY®, SAMSUNG®, etc.), and/or product rating limitations (e.g., customer review "star" ratings).

When the Giver allows clothing to be selected as a gift, the gift rules may be further defined to limit the Recipient to selecting a clothing article that satisfies type limitations (e.g., accessories, jackets, coats, dresses, pants, shirts, skirts, suits, swimwear, etc.), brand limitations, and/or product rating limitations (e.g., customer review "star" ratings).

The Giver may also define whether exceptions to one or more of the gift rules are allowed and, if so, how the exceptions are handled. The gift rules may define that if the Recipient selects a product (candidate product) that does not satisfy certain product characteristics defined by the gift rules and/or if the selected product does not satisfy certain price constraints defined by the gift rules, the Giver can be contacted by communicating a notification to the Giver's communication terminal 120 that requests authorization for the candidate product to be covered by the gift order. Various operations for handling exceptions to gift rules are described below with regard to FIGS. 4 and 7.

Referring again to FIG. 2, the order setup module 112 generates credentials (block 204) that are used by the Recipient to be identified and associated with the gift order, and the Recipient can then be allowed to complete the gift order. The credentials may be anything that can be used to identify a gift order. Credentials may include, but are not limited to, a redemption code, a quick response (QR) code, account login user ID and password, recipient identifier, or another identifier that is associated with the gift order. The credentials may be communicated to the Giver for relay to the Recipient, the credentials may be communicated directly to the Recipient, and/or the credentials may be communicated to another computer server where the credentials can be associated with an account for the Recipient.

During setup of the gift order, the Giver may instruct the order setup module 112 to communicate (block 206) the credentials to the Recipient's communication terminal 120 using a notification message that contains a uniform resource locator (URL) link. The notification message may, for example, be an electronic mail (E-mail) message, a short message service (SMS) message, and/or a multimedia message service (MMS) message. The Recipient can operate the communication terminal 120 to select the URL link to cause a response message containing the credentials to be communicated to the order completion module 114 of the computer server 102. The order completion module 114 can respond to receipt of the response message containing the credentials by associating the Recipient with the gift order and allowing the Recipient to complete the gift order.

The Giver may alternatively or additionally instruct the order setup module 112 to communicate (block 208) a notification message containing the credentials to another computer server, e.g., the third party computer server 150 of FIG. 1, where the credentials are associated with an account 152 for the Recipient. The third party computer server 150 may, for example, host a social media application (e.g., FACEBOOK®) that receives the notification message, validates the credentials, and associates the Recipient with an account for the social media application. The third party computer server 150 may later communicate the credentials to the order completion module 114 on the computer server 102 in response to the Recipient accessing the Recipient's account on the third party computer server 150.

In some embodiments, the order completion module 114 on the computer server 102 may request the credentials from the third party computer server 150 in response to the Recipient accessing an account on the computer server 102 and/or in response to the Recipient providing a defined redemption code or other codeword to the order completion module 114. The order completion module 114 can respond to receipt of the credentials from the third party computer server 150 by associating the Recipient with the gift order and allowing the Recipient to complete the gift order.

In some other embodiments, the third party computer server 150 may perform operations to validate the credentials and to communicate a validation result (e.g., credentials properly validated or not properly validated) to the order completion module 114. Validation of the credentials may, for example, be carried out in response to the Recipient logging into the Recipient's account 152 on the third party computer server 150.

During setup of the gift order, the order setup module 112 may generate a gifting account and define login information that functions as credentials for the Recipient to obtain secure access to the gifting account. The order setup module 112 may communicate (block 210) the login information through a message sent to the Recipient's communication terminal 120. The Recipient may then access the computer server 102 (e.g., via a web client on the Recipient's communication terminal 120) and enter the login information. The order completion module 114 can respond to receipt of the login information by associating the Recipient with the gifting account and allowing the Recipient to complete the gift order.

In some embodiments, the Recipient may provide the credentials to the order completion module 114 before selecting a product that the Recipient wants to be covered (at least in part) by the gift order. As will be explained in further detail below with regard to FIGS. 4, 5, and 6, the order completion module 114 can validate the credentials, associate the Recipient with the gift order, and provide guidance during the Recipient's selection of a product that satisfies the one or more gift rules that have been defined by the Giver.

In some other embodiments, the order setup module 112 can communicate (block 212) credentials to the Recipient which the Recipient can enter after selecting a product to determine whether the selected product is covered by the gift order. The credentials may therefore correspond to order completion credentials that the Recipient can provide to the order completion module 114 after selecting a product, such as a defined pay phrase or defined code (e.g., redemption code) that the Recipient can enter to apply the gift order against the selected product. As will be explained in further detail below with regard to FIG. 7, the order completion module 114, in response to receiving the credentials, may determine whether the gift order may be applied against the selected product(s). In some embodiments, the Recipient may select several products to be covered by the gift order. When the product satisfies the one or more gift rules or is otherwise authorized by the exception handling process, the order completion module 114 charges at least part of the cost of the product to the Giver.

Example Operations and Methods for Completing a Gift Order

Figure 4:
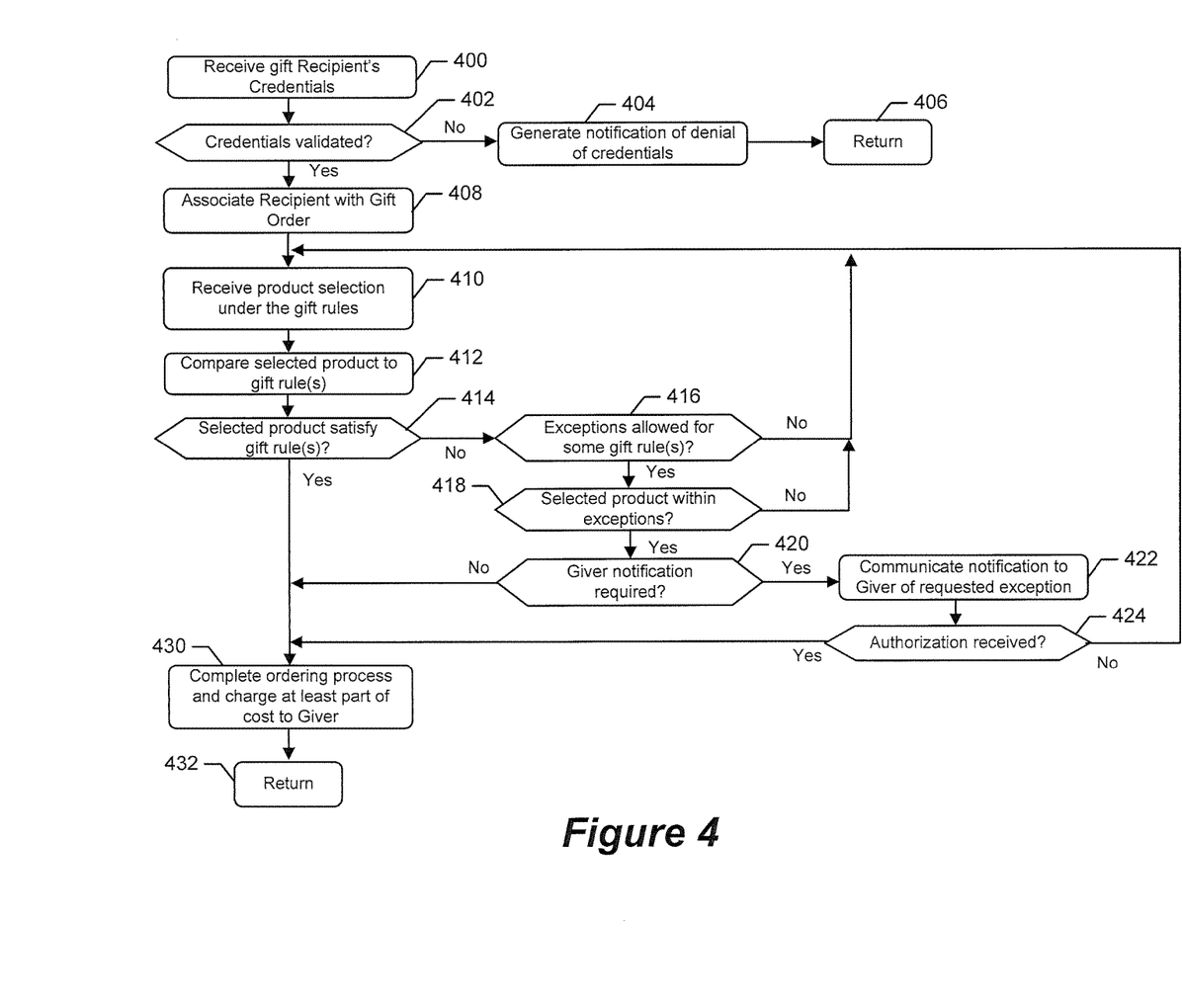
FIG. 4 is a flowchart of operations and methods that may be performed by the order completion module of FIG. 1 to control selection of a product by a gift recipient according to some embodiments described herein.

FIG. 4 is a flowchart of operations and methods that may be performed by the order completion module 114 to control selection of a product by a gift Recipient. Referring to FIG. 4, the Recipient's credentials are received (block 400) by the order completion module 114. The Recipient may provide the credentials by, for example, logging into the computer server 102 from the Recipient's communication terminal 120 using the credentials and/or by other operations described above with regard to Blocks 204-212 of FIG. 2. The credentials are validated (block 402), such as by comparing the credentials against a list of known credentials that may be stored in the gift rules database 113. As explained above, validation of the credentials may be carried out by the order completion module 114 of the computer server 102, by the third party computer server 150, and/or by another element of the system 100.

When the credentials are not properly validated because, for example, they do not match any of the known credentials, a notification indicating that the credentials were not properly validated may be communicated (block 404) back to the Recipient's communication terminal 120 and the operations may return (block 406) to receive further credentials from the Recipient or another user (block 400).

In contrast, when the credentials are properly validated, the Recipient is associated (block 408) with the gift order and is allowed to perform product selection operations (block 410) that comply with the gift rules that have been defined by the Giver. In some embodiments, the gift rules may define a maximum cost that the Giver will pay toward the gift, with the Recipient being required to pay any amount that exceeds what the Giver has agreed to pay to complete a purchase using the gift order. The maximum cost that the Giver has agreed to pay may be defined to include taxes, shipping, and other miscellaneous costs.

The order completion module 114 may use the gift rules (retrieved from the gift rules database 113) to provide guidance to the Recipient as the Recipient performs the product selection operations to identify products that satisfy the gift rules. Alternatively, the order completion module 114 may constrain the Recipient to only searching among products that satisfy the gift rules. The order completion module 114 may display how much co-payment is required from the Recipient to cover a difference between the cost of one of the displayed products and what the Giver has agreed to pay inclusive or exclusive of taxes and/or shipping costs for the displayed product.

The order completion module 114 compares (block 412) a product that has been selected by the Recipient to the gift rules. When the product is determined (block 414) to satisfy the gift rules, the order completion module 114 completes (block 430) the gift order using the selected product and charges at least part of the cost, as defined by the gift rules, to the Giver. The operations then return (block 432) to receive credentials from another gift recipient (block 400). As will be described below regarding FIG. 6, the order completion module may restrict the Recipient to searching among only products that satisfy the gift rules, and in which case the decision at block 414 is not needed because the selected product will always satisfy the gift rules.

When the product is determined (block 414) to not satisfy the gift rules, a further determination (block 416) is made as to whether any exceptions to the gift rules are allowed and, if not, the operations return to continue the product selection operations (block 410). However, when exceptions are allowed, a further determination is made (block 418) as to whether the selected product is within any of the exceptions and, if so, a further determination (block 420) is made as to whether notification is required to be provided to the Giver.

When notification to the Giver is required, a notification message is communicated (block 422) to the Giver that requests authorization for an exception to one or more of the gift rules for the selected product. The notification message may, for example, be an electronic mail (E-mail) message, a short message service (SMS) message, and/or a multimedia message service (MMS) message. The notification message may alternatively or additionally be communicated through a telephone call (e.g., an automated telephone call with a computer generated message and/or by a human operator), a letter sent via postal mail, and/or by another communication process. When a response is received from the Giver, a determination (block 424) is made as to whether the Giver has authorized the selected product to be covered as a gift under the gift order. When the Giver has authorized the selected product to be covered as a gift under the gift order, the order completion module 114 completes (block 430) the gift order using the selected product and charges at least part of the cost, as defined by the gift rules, to the Giver. The operations then return (block 432) to receive credentials to link another gift order with a recipient (block 400).

Example Product Selection Screen Controlled by Gift Rules

Figure 5:
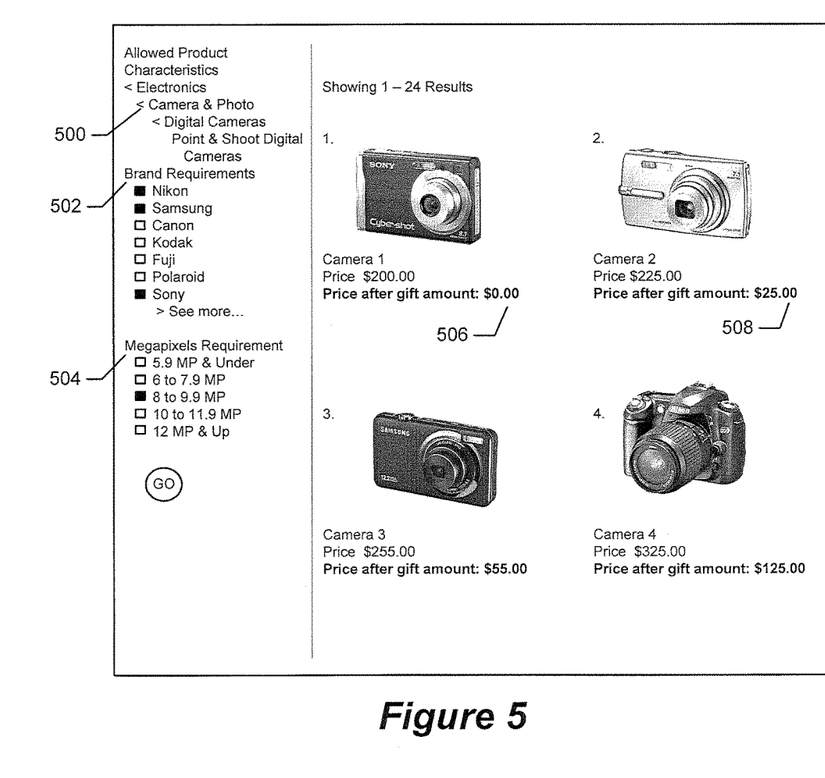
FIG. 5 is an example product selection screen that may be displayed to a gift recipient to provide guidance during the selection of a product subject to the gift rules.

FIG. 5 is an example product selection screen that may be displayed to a Recipient to provide guidance during the selection of a product under the constraints of the gift rules. The example product selection screen may be generated by the operations of block 410 of FIG. 4. Referring to FIG. 5, the order completion module 114 may display an indication of what product characteristics need to be satisfied for a product to be covered as a gift under the gift order. The order completion module 114 may display products from the product inventory database 115 (FIG. 1) in the computer server 102 and/or from a product inventory database within another computer server, such as a computer server operated by a third party merchant (e.g., computer server 150).

As shown in FIG. 5, the gift rules may require a product to be selected from a particular category 500 of products that are available in the product inventory database 115 (e.g., point & shoot digital cameras). The gift rules may further require the product to be manufactured by one or more defined branded companies 502 (e.g., indicated by filled-in boxes adjacent to SONY® SAMSUNG®, and NIKON®). The gift rules may further require the product to have a defined megapixel resolution 504 (e.g. indicated by a filled-in box adjacent to 8 to 9.9 MP) and/or other defined technical characteristics.

The order completion module 114 may limit which products are displayed to the Recipient on the communication terminal 120 to only products that satisfy the gift rules, however products that exceed the maximum cost that the Giver has agreed to pay may still be displayed in accordance with some embodiments. Alternatively, the order completion module 114 may not limit which products are displayed, but may instead indicate which of the displayed products satisfy the gift rules and can be covered by the gift order.

When a displayed product exceeds a price range that is defined by the gift rules, the price that is displayed for that product may reflect a discount that is provided by the gift rules with the remaining price requiring payment from the Recipient. For example, as shown in FIG. 5, the Giver has agreed to pay up to $200 for a gift, which may or may not be defined to include taxes and/or shipping costs. The price of the displayed "camera 1" is $200, so a statement "Price after gift amount: $0.00" may be displayed as item 506 to indicate that the Recipient will be not be charged for the product, but may need to pay for taxes and/or shipping depending upon what the Giver has agreed to pay. In contrast, the price of the displayed "camera 2" is $225.00 which exceeds the Giver's maximum amount by $25.00. Consequently, a statement "Price after gift amount: $25.00" is displayed as item 508 adjacent to the "camera 2" product for viewing by the Recipient. Accordingly, to complete the gift order for "camera 2," the Recipient would pay $25 for "camera 2" and may be further required to pay for taxes and/or shipping costs depending upon what the Giver has agreed to pay.

Example Product Search Screen Controlled by Gift Rules

Figure 6:
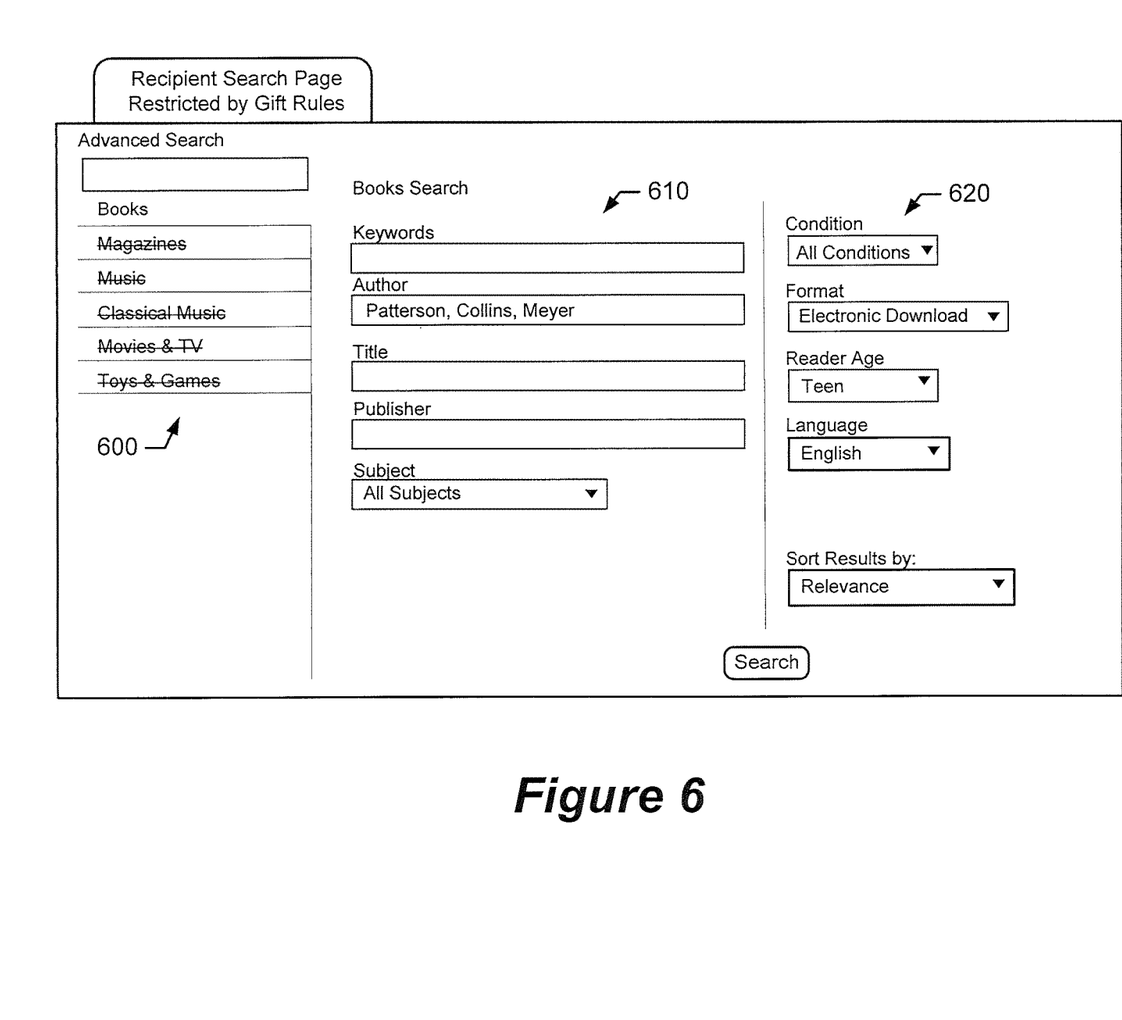
FIG. 6 is an example product search page that may be displayed to a gift recipient to restrict the product search fields in response to gift rules according to some embodiments described herein.

FIG. 6 is an example product search screen that may be displayed by the order completion module 114 on the Recipient's communication terminal 120. The product search screen restricts the Recipient's product searches to products that satisfy the gift rules that have been defined by the Giver. Referring to FIG. 6, the gift rules limit the Recipient's product search to one product category (books) 600. Other product categories that are not allowed to be selected by the Recipient for searching may be crossed-out, shaded, or otherwise not displayed. The gift rules further limit the Recipient's book search to an author field 610 that is restricted to three named authors: Patterson, Collins, and Meyer. The Recipient's book search is further restricted in the fields 620 by the gift rules to one book format ("electronic downloadable" media that excludes paperback books), to a particular reader age classification ("teen"), and to one language ("English"). The Giver may define more or less book characteristics through the gift rules to further constrain what books a Recipient can select from to be covered as a gift under the gift order.

Further Example Operations and Methods for Completing a Gift Order

Figure 7:
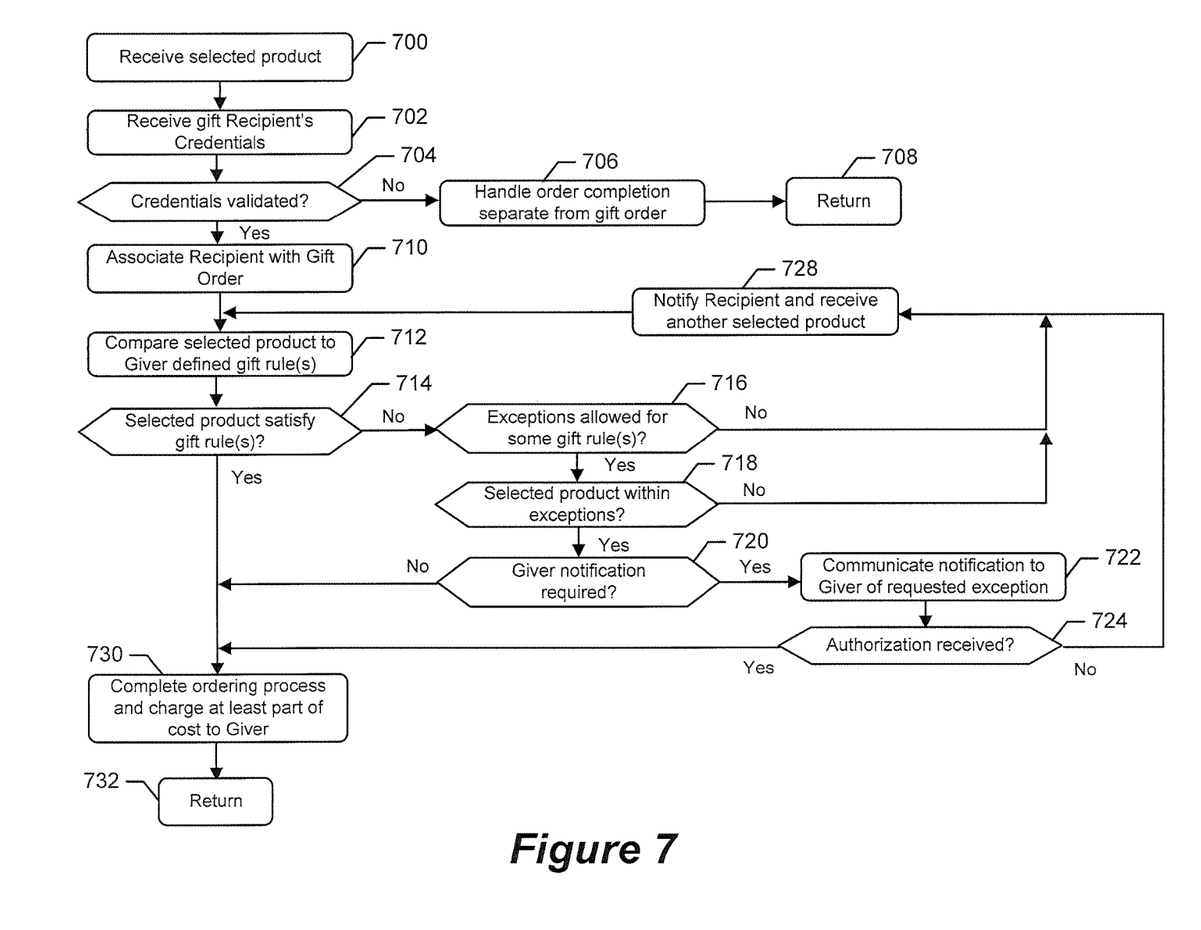
FIG. 7 is a flowchart of operations and methods that may be performed by the order completion module of FIG. 1 to control selection of a product by a gift recipient according to some other embodiments described herein.

FIG. 7 is a flowchart of operations and methods that may be performed by the order completion module 114 of FIG. 1 to control selection of a product by the Recipient. In contrast to the operations of FIG. 4 which may validate the credentials of the Recipient before the gift selection process is performed, the operations of FIG. 7 may be performed after the Recipient has selected a product to validate the Recipient's credentials and determine whether the selected product can be covered as a gift under the gift order.

Referring to FIG. 7, the order completion module 114 receives (block 700) a product that has been selected by the Recipient. The Recipient's credentials are received (block 702) and validated (block 704), such as by comparing the credentials against a list of known credentials that may be stored in the gift rules database 113. The Recipient may provide the credentials by logging onto the computer server 102 using the credentials and/or by other operations described above with regard to Blocks 204-212 of FIG. 2.

When the credentials are not properly validated because, for example, they do not match any of the known credentials, sale of the selected product may be completed (block 706) using another order that is separate from the gift order. The operations may then return (block 708) to receive another product from the Recipient or from another user (block 700).

In contrast, when the credentials are properly validated, the order completion module 114 associates (block 710) the Recipient with the gift order and compares (block 712) the selected product to the gift rules. When the selected product is determined to satisfy the gift rules (block 714), the order completion module 114 completes (block 730) the gift order using the selected product and charges at least part of the cost, as defined by the gift rules, to the Giver. The operations then return (block 732) to receive credentials from another gift recipient (block 700).

In contrast, when the product is determined (block 714) to not satisfy the gift rules (except price), a further determination (block 716) is made as to whether any exceptions to the gift rules are allowed and, if not, the Recipient is notified (block 728) that the selected product is not covered by the gift order and the Recipient may be provided an opportunity to select another product. However, when exceptions are allowed, a further determination is made (block 718) as to whether the selected product is within any of the exceptions and, if so, a further determination (block 720) is made as to whether notification is required to be given to the Giver.

When notification to the Giver is required, a notification message is communicated (block 722) to the Giver that requests authorization for an exception to one or more of the gift rules for the selected product. The notification message may, for example, be an electronic mail (E-mail) message, a short message service (SMS) message, and/or a multimedia message service (MMS) message.

When a response is received from the Giver, a determination (block 724) is made as to whether the Giver has authorized the selected product to be covered as a gift under the gift order. When the Giver has authorized the selected product, the order completion module 114 completes (block 730) the gift order using the selected product and charges at least part of the cost, as defined by the gift rules, to the Giver. The operations then return (block 732) to receive credentials from another gift recipient (block 700).

Example Communication Terminal for Use with Gift Order Handling System

Figure 8:
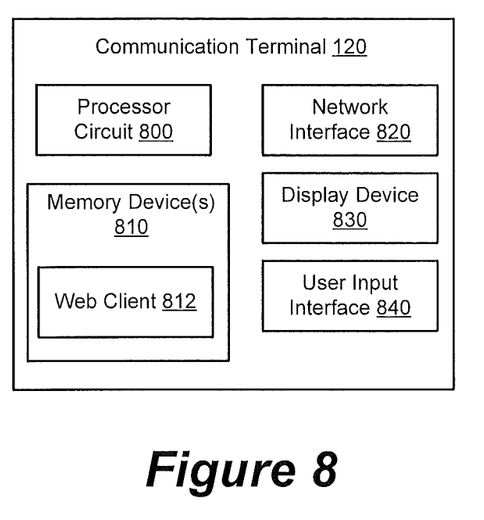
FIG. 8 is a block diagram of a communication terminal that may be used with the gift order handling system of FIG. 1 according to some embodiments described herein.

FIG. 8 is a block diagram of a communication terminal 120 that may be used with the gift order handling system 100 of FIG. 1 according to some embodiments described herein. The communication terminal 120 may be, but is not limited to, a desktop computer, a laptop computer, a cellular telephone, a smartphone, an electronic book reader, or a tablet computer. The communication terminal 120 may include a processor circuit 800, memory device(s) 810, a network interface 820, a display device 830, a user input interface 840 (e.g., keypad, keyboard, touch sensitive display). The memory device(s) 810 can contain functional modules, which may include a Web client 812. The processor circuit 800 may include one or more data processing circuits, such as a general purpose and/or special purpose processor (e.g., microprocessor and/or digital signal processor) with onboard and/or separate memory devices. The processor circuit 800 is configured to execute computer program instructions in the functional modules (e.g., Web client 812) within the memory device(s) 810, which is described below as a computer readable medium, to operate as described herein.

The network interface 820 is configured to communicate with the computer server 102 through the network 130 and/or the radio access network 140. The communication terminal 120 may communicate with the radio access network 140 using one or more cellular radio access technology interfaces that may include Global Standard for Mobile (GSM) communication interface, General Packet Radio Service (GPRS) interface, enhanced data rates for GSM evolution (EDGE) interface, DCS interface, PDC interface, PCS interface, code division multiple access (CDMA) interface, wideband-CDMA interface, CDMA2000 interface, Universal Mobile Telecommunications System (UMTS) interface, and/or 3GPP LTE ($3^{rd}$ Generation Partnership Project Long Term Evolution) interface. The communication terminal 120 may additionally or alternatively communicate with the radio access network 140 using one a Wireless Local Area Network (i.e., IEEE 802.11) interface, a Bluetooth interface, and/or another wireless communication interface.

FURTHER EMBODIMENTS AND DEFINITIONS

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element/step is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented method or process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module," "an engine," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

What is claimed is:

1. A computer implemented method comprising:
generating, in a computing device that includes a processor, a first web client configured to receive a plurality of gift rules from a first client device associated with a first user, individual ones of the plurality of gift rules defining at least one product category, at least one product characteristic, and at least one price range;
generating, in the computing device, a gift order including the gift rules, wherein the gift order is associated with credentials for use by a mobile client device to complete the gift order, the mobile client device being associated with a second user;
transmitting, in the computing device over a radio access network, a notification message to a wireless network interface associated with the mobile client device, the notification message comprising the credentials and a uniform resource locator (URL), wherein the URL, when selected on the mobile client device, initiates a response message comprising the credentials being communicated to the computing device;
validating, in the computing device, the credentials by comparing the credentials to a list of authenticated credentials stored in a database in response to receiving the response message;
generating a restricted list of products from a product inventory database, the restricted list of products comprising a plurality of products from the product inventory database that satisfy the at least one product characteristic defined by at least one of the plurality of gift rules based at least in part on a comparison between individual ones of the plurality of products and the plurality of gift rules;
providing the restricted list of products to a second web client for rendition on the mobile client device by the second web client, the second web client being configured to prevent a display of a product omitted from the restricted list of products or prevent a selection of a product omitted from the restricted list of products;
receiving, in the computing device over the radio access network, from the wireless network interface a selected product from the restricted list of products;
determining, in the computing device, that a selected product category satisfies the plurality of gift rules based at least in part on a comparison between the selected product category and the plurality of gift rules;
determining, in the computing device, that at least one selected product characteristic satisfies the plurality of gift rules based at least in part on a comparison between the at least one selected product characteristic and the plurality of gift rules;
determining, in the computing device, that a selected product price satisfies the plurality of gift rules based at least in part on a comparison between the selected product price and the plurality of gift rules;
updating the second web client to include a confirmation that the selected product satisfies the plurality of gift rules;
controlling how much cost of the selected product is charged to the first client device based at least in part on the selected product category, the at least one selected product characteristic, and the selected product price satisfying the plurality of gift rules; and using, in the computing device, the selected product to complete the gift order.

2. The computer implemented method of claim 1, further comprising:
rendering for display, on the mobile client device, the at least one product category;
rendering for display, on the mobile client device, the at least one price range; and
rendering for display, on the mobile client device, and the at least one product characteristic.

3. The computer implemented method of claim 1, wherein transmitting the notification message further comprises
transmitting the notification message to a computer server on which the second user has an account.

4. The computer implemented method of claim 1, wherein the at least one gift rule indicates at least one of a brand restriction, a product rating restriction, or a product category restriction.

5. The computer implemented method of claim 1, wherein the list of products is constrained to a group of products that satisfy the plurality of gift rules.

6. The computer implemented method of claim 1, further comprising:
responding, in the computing device, to the generation of the gift order by communicating a notification message containing the credentials for the second user to another computer server for association with an account for the second user.

7. The method of claim 1, wherein the notification message comprises at least one of: an electronic mail (e-mail) message, a short message service (SMS) message, or a multimedia message service (MMS) message.

8. A system, comprising:
a first server comprising a processor and a memory; and
an application stored in the memory and executable by the processor to cause the first server to at least:
generate a gift order based at least in part on at least one of a plurality of gift rules received from a first client device associated with a first user, wherein the gift order is intended for delivery to a second client device associated with a second user, wherein the at least one of the gift rules defines at least one product category, at least one product characteristic, and at least one corresponding price range;
transmit the gift order, over a radio access network, to a wireless network interface associated with the second client device;
transmit a credential request, over the radio access network, to a second server in response to the second client device accessing an account on the at least one computing device, the credential request comprising a user identifier associated with the second user;
associate a credential with the gift order in response to receiving, from the second server, a response message comprising the credential;
generate a restricted list of products from a product inventory database in response to the second client device rendering a web client associated with the gift order and determining which of a plurality of products from the product inventory database satisfy the at least one product characteristic and the at least one product category associated with the at least one of the plurality of gift rules based at least in part on a comparison between individual ones of the plurality of products and the plurality of gift rules;
provide the restricted list of products to the web client rendered on the second client device, the second web client being configured to prevent a display of a product omitted from the restricted list of products or prevent a selection of a product omitted from the restricted list of products;
receive, over the radio access network from the wireless network interface, a selected product from the restricted list of products from the second client device, the selected product being received from a user interface; and
control how much cost of the selected product is charged to the first user based at least in part on the at least one corresponding price range.

9. The system of claim 8, wherein the application further causes the first server to at least:
transmit a credential request, over the radio access network, to a second server in response to receiving a plurality of instructions from the first user using the first client device.

10. The system of claim 9, wherein the application further causes the first server to at least:
respond to the instructions from the first user using the first client device by communicating a notification message containing a uniform resource locator link that, when selected by the second user using the second client device, communicates to the at least one computing device a reply message containing one or more credentials; and
respond to receipt of the reply message containing the one or more credentials by associating the second user using the second client device with the gift order.

11. The system of claim 9, wherein the application further causes the first server to at least:
respond to the instructions from the first user using the first client device by communicating a notification message containing one or more credentials to another computer server for association with an account for the second user; and
respond to receiving from the other computer server a credential message containing the one or more credentials by associating the second user using the second client device with the gift order.

12. The system of claim 11, wherein the application further causes the first server to at least:
communicate the notification message containing the one or more credentials to a social media application hosted on the other computer server for association with the account for the second user.

13. The system of claim 9, wherein the application further causes the first server to at least:
respond to the instructions from the first user using the first client device by generating a gifting account and associated login information for use by the second user using the second client device as one or more credentials to complete the gift order; and
respond to receipt of the login information by providing the second user using the second client device access to the gifting account.

14. The system of claim 13, wherein the application further causes the first server to at least:
generate at least one of an electronic mail message, a short message service message, or a multimedia message service (MMS) message containing the login information to the second client device that is associated with the second user.

15. The system of claim 9, wherein the application further causes the first server to:

respond to the instructions from the first user using the first client device by generating a plurality of order completion credentials for use by the second user; and respond to receipt of the order completion credentials from the second user using the second client device by associating the second user with the gift order and determining whether the product selected by the second user satisfies the at least one of the gift rules defined by the first user using the first client device.

16. The system of claim 8, wherein the at least one gift rule indicates at least one of a brand restriction, a product rating restriction, or a product category restriction.

17. The system of claim 8, wherein the application further causes the first server to:

render for display on the second client device the at least one product category;

render for display on the second client device the at least one price range; and render for display on the second client device the at least one product characteristic.

18. A non-transitory computer-readable medium embodying a program executable in at least one computing device, wherein when executed, the program causes the at least one computing device to at least:

receive at least one gift rule from a first web client rendered on a first client device associated with a first user, the at least one gift rule defining at least one product category, at least one price range, and at least one product characteristic;

generate a gift order including the at least one gift rule, wherein the at least one product characteristic and the at least one price range must be satisfied by a candidate product to be a gift under the gift order;

transmit a notification message over a radio access network to a wireless network interface associated with a second client device, the notification message comprising the gift order and a uniform resource locator (URL) that, when selected by a second user using the second client device, communicates a response message comprising one or more credentials for the second user to the at least one computing device;

in response to receiving the response message, associate the second user with the gift order;

generate a restricted list of products from a product inventory database that includes a plurality of products from the product inventory database that satisfy the at least one product characteristic of the gift rule based at least in part on a comparison between individual ones of a plurality of products in the product inventory database and the at least one product characteristic;

generate a second web client that includes the restricted list of products in response to an action received from the second client device associated with a second user, the second web client being configured to prevent a display of a product omitted from the restricted list of products or prevent a selection of a product omitted from the restricted list of products;

receive, over the radio access network from the wireless network interface, a selected product from the list of products rendered on the second web client on the second client device;

determine that a selected product category satisfies the at least one gift rule based at least in part on a comparison between the selected product category and the at least one gift rule;

determine that at least one selected product characteristic satisfies the at least one gift rule based at least in part on a comparison between the selected product category and the at least one gift rule;

determine that a selected product price satisfies the at least one gift rule based at least in part on a comparison between the selected product price and the at least one gift rule;

control how much cost of the selected product is charged to the first user using the first client device based at least in part on the selected product category, the at least one selected product characteristic and the selected product price satisfying the at least one gift rule; and respond to determining that the selected product satisfies the at least one gift rule by completing the gift order using the selected product.

19. The non-transitory computer-readable medium of claim 18, wherein the program causes the at least one computing device to at least:

respond to the second user using the second client device to select an unsatisfactory candidate product that does not satisfy the at least one gift rule by communicating a notification to the first client device requesting an authorization for the unsatisfactory candidate product;

respond to an approval of the authorization from the first client device for the unsatisfactory candidate product by using the candidate product to complete the gift order; and respond to a denial of the authorization from the first client device by not using the unsatisfactory candidate product to complete the gift order.

20. The non-transitory computer-readable medium of claim 18, wherein the program causes the at least one computing device to at least:

respond to generation of the gift order by communicating a notification message containing one or more credentials for the second user to another computer server for association with an account for the second user; and respond to receiving from the other computer server a credential message containing the one or more credentials for the second user by associating the second user with the gift order.

21. The non-transitory computer-readable medium of claim 18, wherein the program causes the at least one computing device to at least:

respond to generation of the gift order by generating a gifting account and associated login information for use by the second user to complete the gift order; and respond to receipt of the login information by providing the second user access to the gifting account.

22. The non-transitory computer-readable medium of claim 18, wherein the program causes the at least one computing device to at least:

respond to generation of the gift order by generating one or more order completion credentials for use by the second user using the second client device; and respond to receipt of the one or more order completion credentials from the second user by associating the second user with the gift order and determining whether the selected product selected by the second user using the second client device satisfies the at least one gift rule defined by the first user.

23. The non-transitory computer-readable medium of claim 18, wherein the program causes the at least one computing device to at least:

control how much cost of the selected product is charged to the first user using the first client device in response to the at least one gift rule.

24. The non-transitory computer-readable medium of claim 23, wherein the program causes the at least one computing device to at least:
- render for display on the second client device the at least one product category;
- render for display on the second client device the at least one price range; and
- render for display on the second client device the at least one product.

25. The non-transitory computer-readable medium of claim 18, wherein the list of products is constrained to a group of products that satisfy the at least one gift rule.

26. The non-transitory computer-readable medium of claim 18, wherein the at least one gift rule indicates at least one of a brand restriction, a product rating restriction, or a product category restriction.

* * * * *